United States Patent
Yamazaki et al.

[11] Patent Number: 5,872,644
[45] Date of Patent: Feb. 16, 1999

[54] FIBER-OPTIC ACCESS SYSTEM FOR SUBSCRIBER OPTICAL COMMUNICATION

[75] Inventors: Shuntaro Yamazaki; Takeshi Nagahori, both of Tokyo, Japan

[73] Assignee: NEC Corporation, Japan

[21] Appl. No.: 967,298

[22] Filed: Nov. 15, 1997

Related U.S. Application Data

[63] Continuation of Ser. No. 803,327, Feb. 21, 1997, abandoned, which is a continuation of Ser. No. 659,622, Jun. 6, 1996, abandoned, which is a continuation of Ser. No. 498,197, Jul. 5, 1995, abandoned.

[30] Foreign Application Priority Data

Jul. 5, 1994 [JP] Japan ................................ 6-153196

[51] Int. Cl.[6] .............................. H04B 10/20; H04J 14/00
[52] U.S. Cl. ......................... 359/121; 359/120; 359/164; 359/168
[58] Field of Search .................................... 359/117, 118, 359/120, 121, 125, 128, 133, 135, 136, 137, 163, 164, 167, 168, 189

[56] References Cited

U.S. PATENT DOCUMENTS

| | | | |
|---|---|---|---|
| 5,170,272 | 12/1992 | Onno ....................................... | 359/167 |
| 5,200,631 | 4/1993 | Austin et al. .............................. | 385/14 |
| 5,448,388 | 9/1995 | Ohde et al. ............................... | 359/137 |
| 5,459,607 | 10/1995 | Fellows et al. ........................... | 359/158 |

OTHER PUBLICATIONS

Bar–Chaim et al, "Integrated Optoelectronics", *IEEE Spectrum,* May 1982, pp. 38–44.

I. Kobayashi, "The Dawn of Fiber–Optic Access Networks", Fiber–Optic Subscriber Loops, Special Edition, IEEE Communications Magazine, Feb. 1994, vol. 32, No. 2, pp. 33–86.

*Primary Examiner*—Leo H. Boudreau
*Assistant Examiner*—Bhavesh Mehta
*Attorney, Agent, or Firm*—Ostrolenk, Faber, Gerb & Soffen, LLP

[57] ABSTRACT

A fiber-optic access system for subscriber optical communication adopting star type topology in an optical fiber network includes a central office, a plurality of optical network units, an optical interface, and a signal recognition/reproduction and clock extraction IC. The optical interface is provided in the central office and includes an array optical transmission module as a package unit accommodating a plurality of light sources and a plurality of output fiber terminals, and an array optical reception module as a package unit accommodating a plurality of optical sensors and a plurality of input fiber terminals. The signal recognition/reproduction and clock extraction IC is provided to each channel of the array optical reception module. The access system provided is of a scale comparable to that of a central office side optical interface of PDS and wide band characteristics comparable to those of a single star type system.

5 Claims, 5 Drawing Sheets

FIBER-OPTIC ACCESS SYSTEM FOR SUBSCRIBER OPTICAL COMMUNICATION

This is a Continuation of application Ser. No. 08/803,327, filed on Feb. 21, 1997, now abandoned; which is a Continuation of application Ser. No. 08/659,622; filed on Jun. 6, 1996, now abandoned; which is a Continuation of application Ser. No. 08/498,197, filed on Jul. 5, 1995, now abandoned.

BACKGROUND OF THE INVENTION (1) Field of the Invention

The present invention relates to a fiber-optic subscriber communication system using star type topology for fiber-optic networks, and more particularly to a fiber-optic access system in such a communication system.

(2) Description of the Related Art

A fiber-optic subscriber communication system, particularly that for telephone or like low transfer rate services, has used a passive double star (PDS) type network in order to minimize the cost of fiber-optic networks and optical interfaces in the central office (CO) side. In such a system, as shown in FIG. 1, an optical fiber 84 connected to a single optical interface (IF) 83 in the CO 81 is branched by a passive splitter 85 in the network and connected to a plurality of optical network units (ONUs) 86. Reference numeral 82 in the CO 81 denotes a switcher (SW). An optical interface 87 in each of the ONUs 86 is connected to a plurality of subscriber homes 88. Please refer to "Fiber Optic Subscriber Loop, Special Edition", IEEE Communications Magazine, February 1994, Vol. 32, No. 2. In this scheme, a plurality of ONUs 86 commonly use the CO-side optical interface 83 and also part of the transmission line 84.

In the system that provides wide band services, the PDS scheme has not been used but a single star type fiber network has been used as shown in FIG. 2, in which the transmission line 94 is laid from the single CO 91 to each of the ONUs 96 on a one-to-one basis. In FIG. 2, the reference numeral 92 denotes a switcher; 93, 97 denote an optical interface; and 98 denotes a subscriber home.

Where the PDS is used, however, a bottle neck problem is encountered if it is intended to accommodate high rate services because of the common use of part of transmission line by all the ONUs. More specifically, in the common part of transmission line, signals between all the ONUs and the CO are multiplexed in their transmission. This means that the transfer rate necessary for the common transmission line part is the product of one band required for the ONU multiplied by the number of ONUs. For this reason, for accommodating high rate services by using PDS, a super-high transfer rate has to be set for the optical interface, or resort has to be had to the provision of new channels by using the wavelength multiplexing technique. With the PDS, however, it is difficult to sufficiently increase the transfer rate because the upstream line (that is, data transfer from the ONU to the CO) is of a multi-access system in the burst mode. In addition, the above methods dictate very high cost.

Accordingly, the single star type scheme as described before is used to accommodate the high rate services. In this case, unlike the PDS, there is no bottle neck problem because there is no common transmission line part to the ONUs. However, on the CO-side, the same number of optical interfaces 93 as the number of ONUs 96 is necessary as shown in FIG. 2. Therefore, the merits of the PDS, i.e., the small scale and low cost of the CO, are lost.

SUMMARY OF THE INVENTION

An object of the invention, therefore, is to overcome the problems existing in the prior art and to provide a new fiber-optic access system for subscriber optical communication, which is of a scale and a cost comparable to those of the CO-side optical interface of the PDS and wide band characteristics comparable to those of the single star type system.

According to one aspect of the invention, there is provided a fiber-optic access system for subscriber optical communication adopting star type topology in an optical fiber network, the fiber-optic access system comprising:
- a central office;
- a plurality of optical network units which are connected with the central office by optical fibers;
- an optical interface which is provided in the central office and which includes an array optical transmission module as a package unit accommodating a plurality of light sources and a plurality of output fiber terminals, and an array optical reception module as a package unit accommodating a plurality of optical sensors and a plurality of input fiber terminals; and
- a circuit which is provided to each channel of the array optical reception module and which has functions of recognizing and reproducing a data signal transmitted from each of the optical network units to the central office and of extracting a clock signal synchronized with the data signal.

According to a second aspect of the invention, there is provided a fiber-optic access system for subscriber optical communication adopting star type topology in an optical fiber network, the fiber-optic access system comprising:
- a central office;
- a plurality of optical network units which are located in homes and connected with the central office by optical fibers;
- a plurality of optical interfaces which are provided in the central office and each of which includes an array optical transmission module as a package unit accommodating a plurality of light sources and a plurality of output fiber terminals and an array optical reception module as a package unit accommodating a plurality of optical sensors and a plurality of input fiber terminals; and
- a circuit which is provided to each channel of the array optical reception module and which has functions of recognizing and reproducing a data signal transmitted from each of the optical network units to the central office and of extracting a clock signal synchronized with the data signal.

The fiber-optic access system according to the invention achieves the cost saving and band extension. The invention is predicated in the single star type structure which is excellent in the wide band characteristics. The difference of the invention from the prior art resides in the employment of array optical transmission and reception modules for the CO-side optical interface. The array optical transmission and reception modules are unit packages including a plurality of optical transmission and reception circuits, and a plurality of optical fiber terminals. Thus, they permit a great reduction in scale and cost compared to the case where a plurality of single optical transmission and reception modules are mounted. Thus, with the single star type structure, it is possible to realize a cost and an equipment scale which are comparable to those of the CO-side optical interface for the PDS. In another aspect, in the PDS, the signal transmitted from the ONU to the CO is in the burst mode, thus imposing a limitation on the transfer rate of the optical interface. Specifically, the upper limit of the transfer rate is about 150 Mb/s. This means that where there are 16 branches of the PDS, for instance, the capacity (transfer rate) of the upstream line allotted to each ONU (i.e., line from the ONU to the CO) is lower than 10 Mb/s. In contrast, according to the invention, there is no such transfer rate limitation because the single star type scheme is adopted. However, the upper limit of the band of the array optical reception module is subject to inter-channel cross-talks. Nevertheless, it is possible to realize as high transfer rate as about 1 Gb/s. Thus, according to the invention, it is possible to provide to the ONU an upstream line having a band which is as wide as several tens to one hundred times compared to the conventional PDS.

The array optical transmission and reception modules have heretofore been developed for the purpose of communication between computers or like data link parallel transmission. In these uses, a plurality of parallel data signals are substantially bit-synchronized. Thus, a common clock signal has been used for the individual channels and is transmitted in parallel to the above mentioned parallel data signals. However, in the single star type access as used in the invention, the distance between the CO and the ONU greatly varies with each ONU. That is, there is no correlation among the upstream signals from the individual ONUs. Therefore, the CO has to extract a clock signal for each channel, and it has been impossible to use the prior art array optical reception module for data link directly. According to the invention, a circuit having functions of identifying and reproducing a received data and extracting a clock signal, is provided for each channel of array optical reception module. Thus, it is possible to obtain a proper clock signal for each channel even if the relative position relation of the upstream signals from the individual ONUs is not fixed.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Now, preferred embodiments of the invention are explained with reference to the accompanying drawings.

Figure 1:
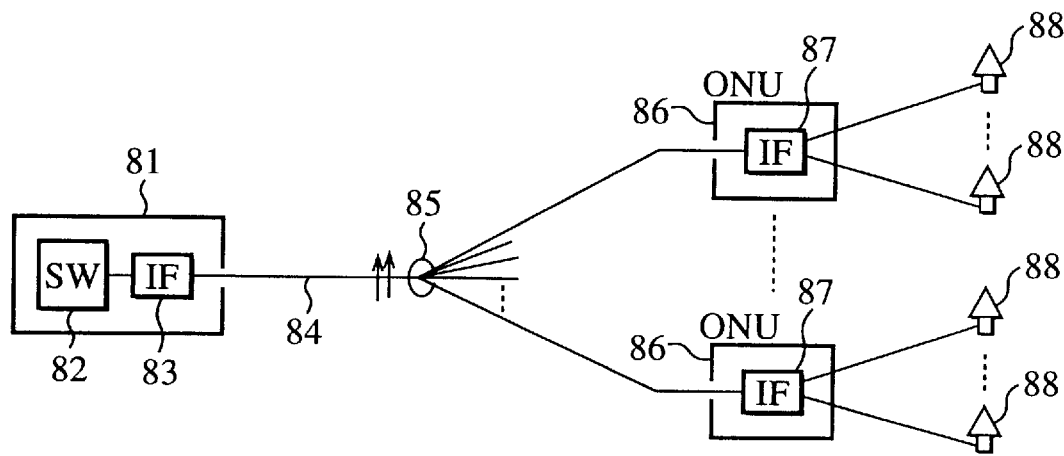
FIG. 1 is a structural diagram of an example of a conventional PDS.
Figure 2:
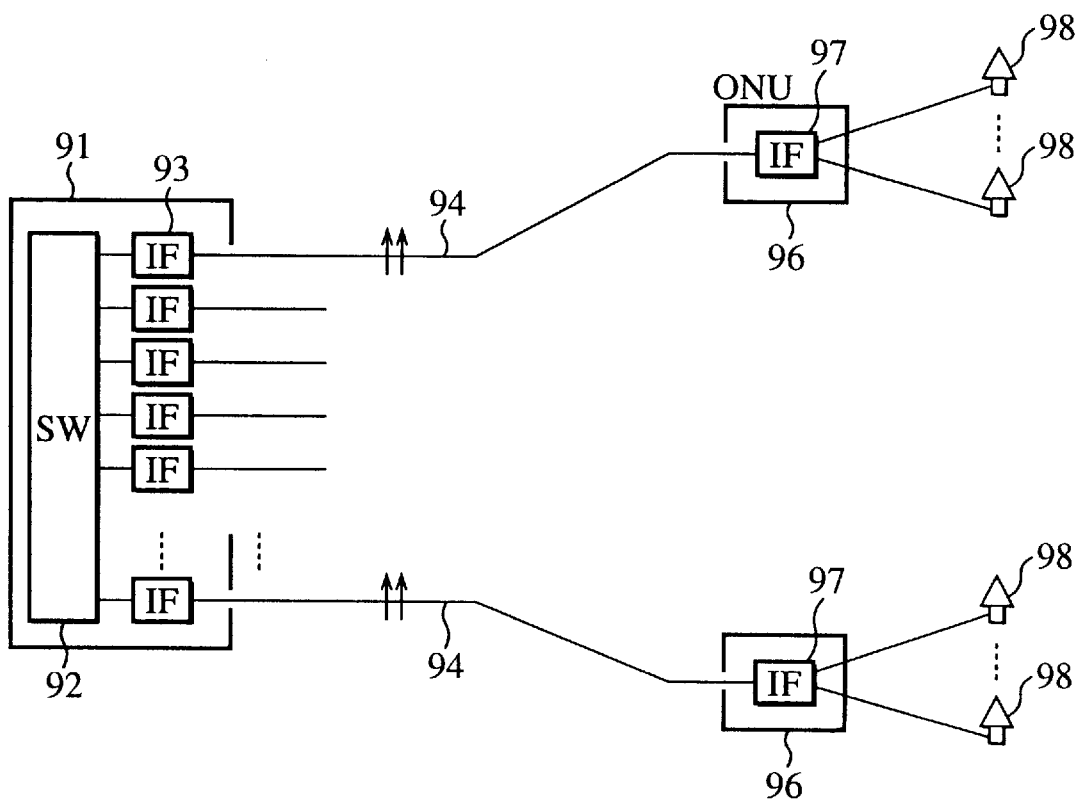
FIG. 2 is a structural diagram of an example of a conventional single star type network.
Figure 3:
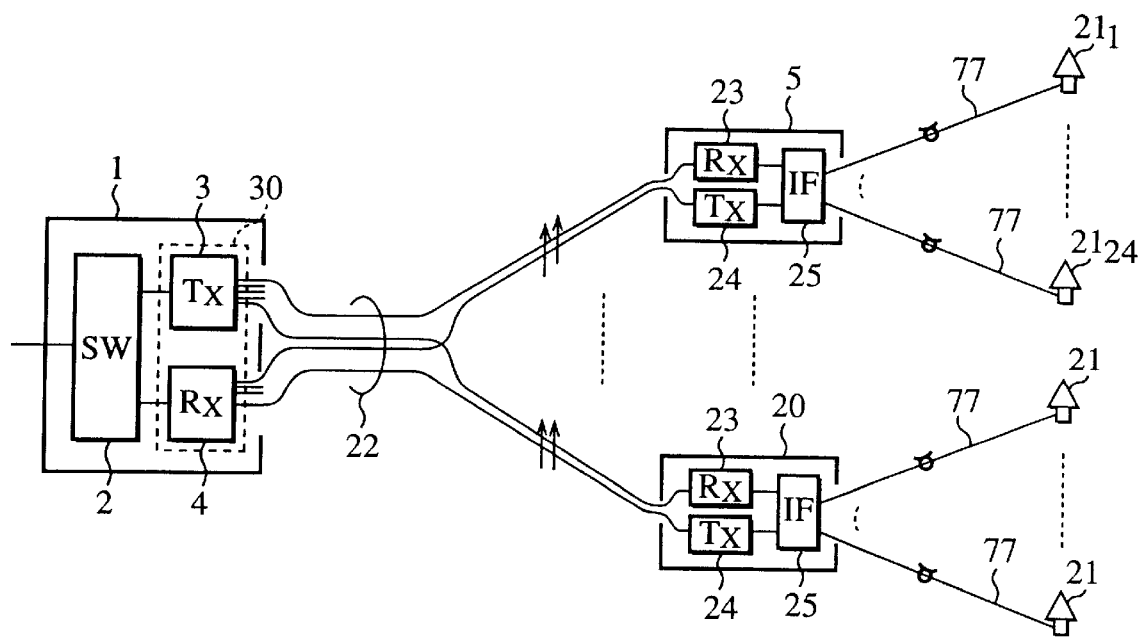
FIG. 3 is a structural diagram of a fiber-optic access system of a first embodiment according to the invention.

A first embodiment of the invention will now be described. In this embodiment, the feature of a first aspect of the invention is applied to an FTTC (fiber to the curb) type fiber-optic access system. The structure of the embodiment is shown in FIG. 3. In a central office (CO) 1, there are provided a switcher (SW) 2, an array optical transmission module (Tx) 3 and an array optical reception module (Rx) 4. The array optical transmission module 3 and the array optical reception module 4 constitute a CO-side optical interface 30. In the network system, sixteen ONUs 5 through 20 are connected. The CO-side optical interface 30 is connected to the sixteen ONUs 5 to 20 through a plurality of optical fibers 22. In each ONU, an optical reception module (Rx) 23 and an optical transmission module (Tx) 24 are provided. Each ONU includes a subscriber line interface (IF) 25, from which coaxial cables 77 extend to twenty four subscriber homes 21. Thus, 4 channels of 6 Mb/s video signal and 64 kb/s telephone service can be provided to each subscriber home 21. The data transfer rate between the CO 1 and each of the ONUs 5 through 20 is 600 Mb/s in a downstream direction for video and telephone service data for 24 homes and 1.5 Mb/s in an upstream direction for telephone service data.

Figure 4:
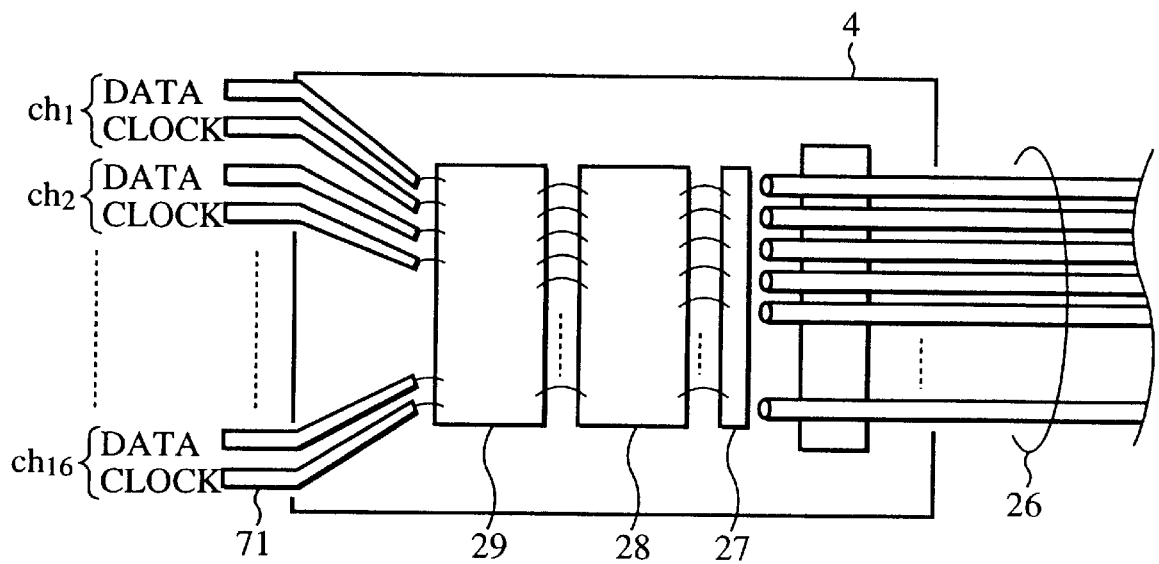
FIG. 4 is a diagram of an internal structure of an array optical reception module in the fiber-optic access system according to the invention.

The array optical reception module (Rx) 4 has an internal structure as shown in FIG. 4. A first 16-core fiber ribbon 26 has an end face secured at a position near a 16-channel array optical sensor 27. Thus, light emitted from each fiber of the fiber ribbon 26 is incident on each light-receiving portion of the array optical sensor 27. The array optical sensor 27 has each of its signal electrodes connected to each input terminal of a 16-channel array pre-amplifier IC 28. The array pre-amplifier IC 28 has each output terminal connected to each input terminal of a 16-channel IC 29 which has functions of identification, reproduction, and clock signal extraction. From the output terminals 71 of the IC 29, there appear 16 channel data signals of 1.5 Mb/s transmitted from the individual ONUs and 16 channel clock signals synchronized to the respective data signals. The data signal is phase matched for each channel by using the extracted clock signal before being inputted to the switcher 2 (see FIG. 3).

Figure 5:
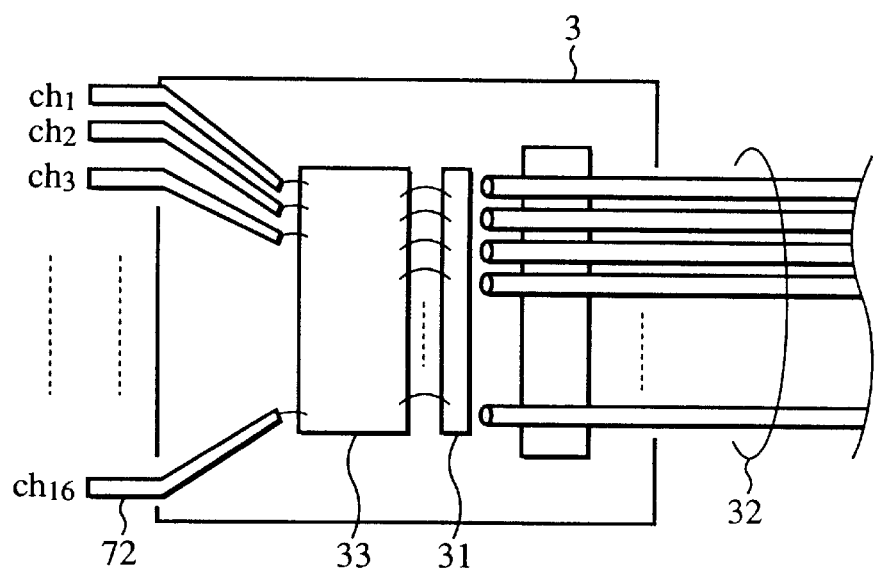
FIG. 5 is a diagram of an internal structure of an array optical transmission module in the fiber-optic access system according to the invention.

The array optical transmission module (Tx) 3 has an internal structure as shown in FIG. 5. As shown therein, the optical transmission module 3 comprises a 16-channel array semiconductor laser 31, a second 16-core fiber ribbon 32, and an array laser driver IC 33. Thus, 16 channel downstream signals applied to the input terminals 72 of the driver IC 33 can be transmitted with a single module. With the structures as described above, it is possible to reduce the scale of the CO-side optical interface and realize an FTTC (fiber to the curb) access system which can provide wide band services.

Figure 6:
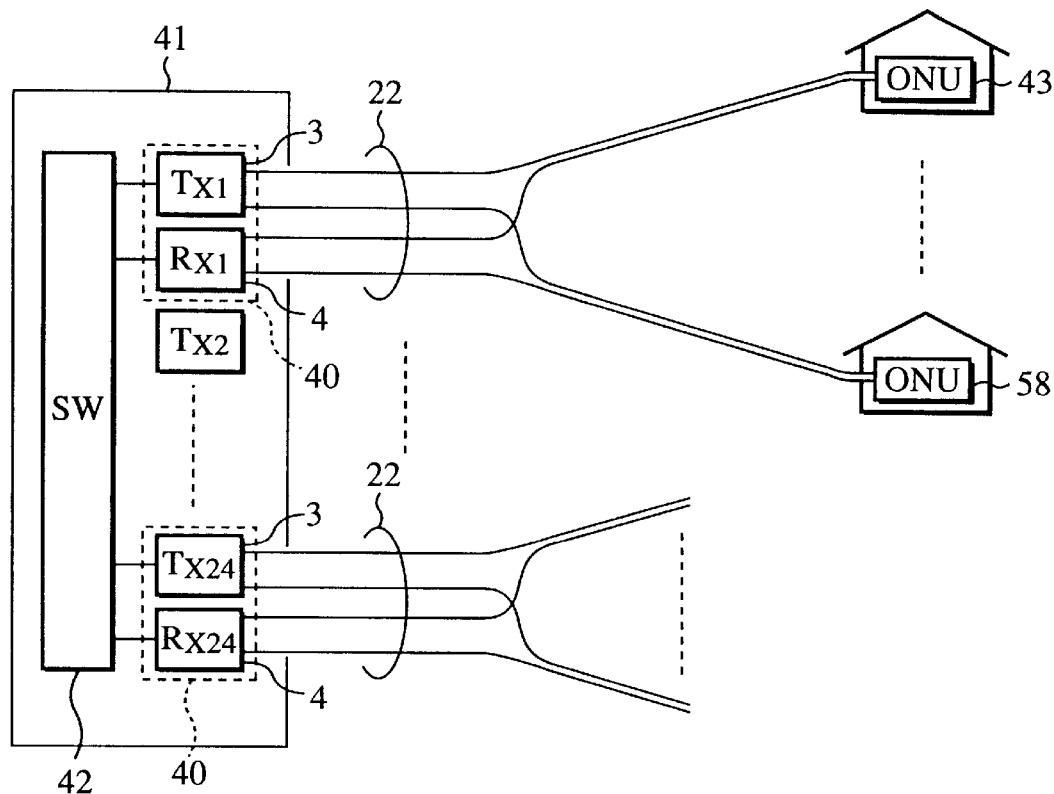
FIG. 6 is a structural diagram of a fiber-optic access system of a second embodiment according to the invention.

A second embodiment will now be described. In the second embodiment, the feature of the first aspect of the invention is applied to an FTTH (fiber to the home) access system. The structure of this embodiment is shown in FIG. 6. In a central office (CO) 41, there are provided a switcher (SW) 42, twenty four array optical transmission modules 3, and twenty four array optical reception modules 4. To each array optical transmission module 3 and each array reception module 4 are connected to sixteen ONUs 43 to 58 in the subscriber homes via optical fibers 22. Though not shown in the drawings, in each ONU, an optical reception module and an optical transmission module are provided. There are 4 channels of 6 Mb/s video signal and 1.5 Mb/s ISDN primary rate service that are provided to each home. The data transfer rate is thus 25.5 Mb/s in a downstream direction for video signal and ISDN primary rate service data, and 1.5 Mb/s in an upstream direction for ISDN primary rate service data.

The array optical reception module 3 and the array optical transmission module 4 have the same internal structures as in the preceding first embodiment, so they are not described any further here. The sole difference of this embodiment is that the data transfer rate is 25.5 Mb/s in a downstream direction as noted above, which is lower than in the first embodiment. When realizing an FTTH access system with the prior art single star structure, the same number of optical interfaces as the number of subscribers was necessary on the CO-side. According to the invention as applied to this embodiment, the number of optical interfaces can be reduced down to one-sixteenth.

Figure 7:
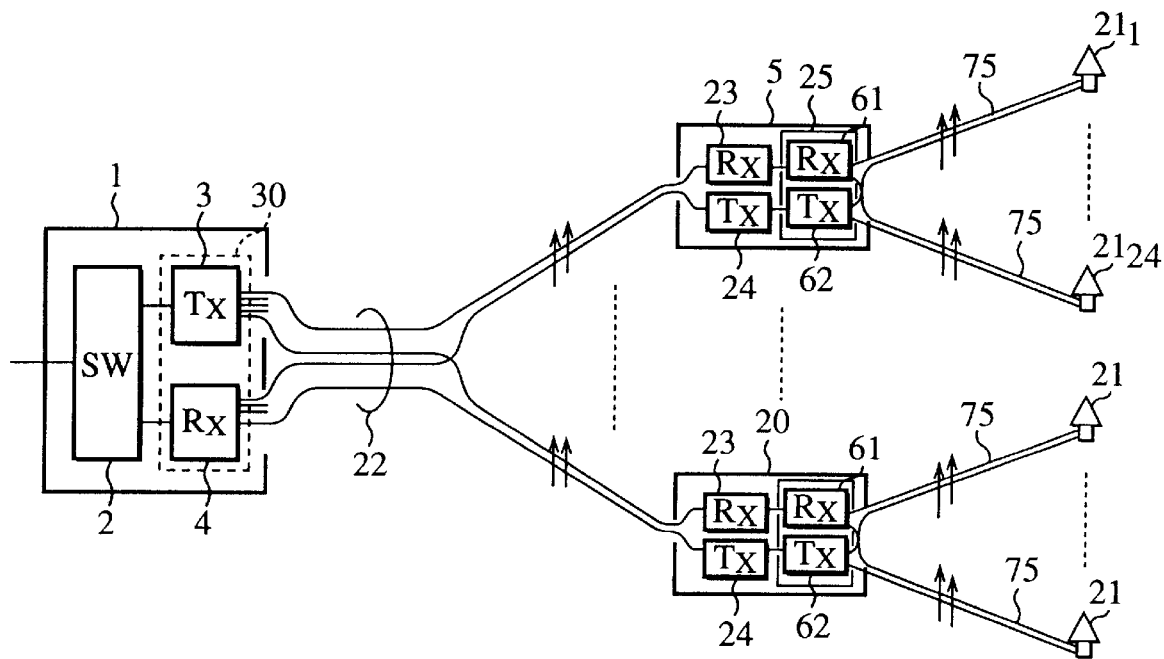
FIG. 7 is a structural diagram of a fiber-optic access system of a third embodiment according to the invention.

A third embodiment of the invention will now be described. In this embodiment, the feature of a second aspect of the invention is applied to an FTTC (fiber to the curb) access system. The structure of this embodiment is shown in FIG. 7. Specifically, in this embodiment, a plurality of optical fibers 75 are used for transmission lines between the ONUs 5 to 20 and the homes 21 in the first embodiment. A subscriber-line interface 25 in each ONU (5 to 20) includes a 24-channel array optical reception module (Rx) 61 and a 24-channel array optical transmission module (Tx) 62. These modules are the same in structure as the previous array optical reception and transmission modules 4 and 3, and are different only in the number of channels and the data transfer rate. The data transfer rate is the same as that on the coaxial cable in the first embodiment, that is, 24 Mb/s in a downstream direction and 64 kb/s in an upstream direction. A feature of this embodiment is that it is possible to increase distance covered because of the use of optical fibers from each ONU to each subscriber home, thus increasing the freedom of the network design. The remainder is the same as the first embodiment, and is not described.

As has been described in the foregoing, it is possible to provide a fiber-optic access system, which can realize both the wide band characteristics and the reduction of the scale and cost of the CO-side interface. However, the invention is not limited to the three embodiments described above as, for example, the following modification is conceivable.

Where a central office (CO) accommodates a number of PDS systems in a PDS fiber-optic access system, a plurality of optical interfaces are necessary on the CO-side. By applying the invention, it is possible to realize small scale CO system as in the above embodiments. However, as described before, in the PDS, the upstream line is a burst mode multi-access system. That is, the CO side array optical reception module 4 deals with burst signal, and at the same time a multi-access control circuit is provided for each channel. The multi-access control circuit is large in scale, and sometimes it may be thought difficult to collectively mount this control circuit in the array optical reception module. In such a case, the control circuit is provided in the neighborhood of the module.

The PDS is an effective means for realizing cost reduction of telephone and other low rate services. However, where subscribers requiring high rate services such as business building coexist in a service area, it is desirable to use both PDS and single star in the same network. In this case, CO side optical interfaces according to the invention and CO side optical interfaces of PDSs coexist.

Figure 8:
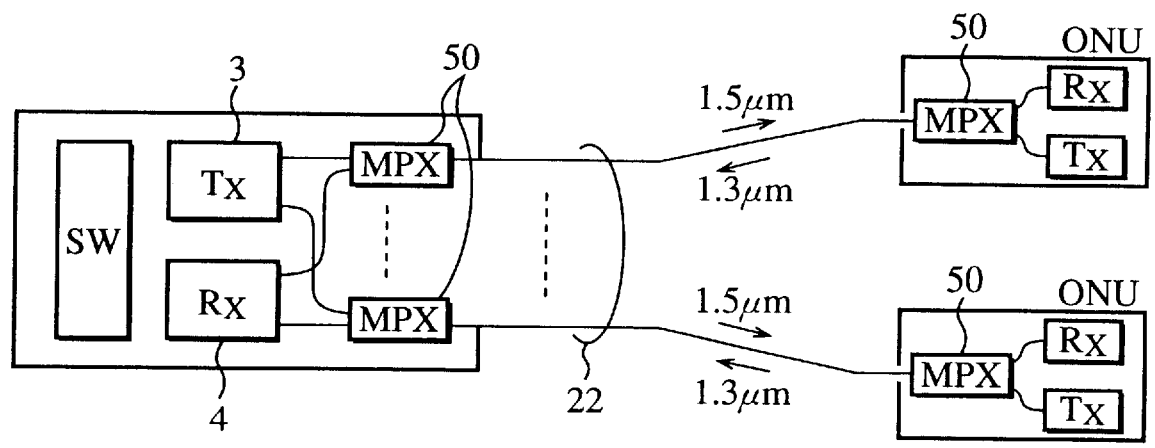
FIG. 8 is a diagram of a modified fiber-optic access system according to the invention.

While, in the above embodiments, bi-directional transmission system based on 2-core optical fiber is used between the CO and the ONU, it is possible to apply the invention to a single-core bi-directional transmission system aiming at cost reduction. In such a case, it is possible to adopt a wavelength multiplexing technique for an upstream and a downstream, or adopt a time compression multiplexing (TCM) transmission system. Where the wavelength multiplexing system is adopted, as shown in FIG. 8, wavelength multiplexing separation couplers are connected to the individual channel fibers of the array optical transmission and reception modules 3 and 4. In this example, the downstream signal is at a wavelength of 1.5 $\mu$m, and the upstream signal is at a wavelength of 1.3 $\mu$m. In the case of the TCM communication system, directional couplers are used in lieu of the wavelength multiplexing separation couplers shown in FIG. 8. In this case, it is also necessary to provide each of the array optical transmission and reception modules 3 and 4 with a compression circuit for TCM transmission system.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. A fiber-optic access system for subscriber optical communication adopting star type topology in an optical fiber network, said fiber-optic access system comprising:

a central office;

a plurality of optical network units connected with said central office by optical fibers;

an optical interface provided in said central office, said optical interface including an array optical transmission module having a plurality of channels through which data signals are transmitted to said plurality of optical network units through said optical fibers, and an array optical reception module having a plurality of channels through which data signals are received from said plurality of optical network units through said optical fibers; and a circuit provided to each channel of said array optical reception module and which extracts a clock signal for each data signal to synchronize said each data signal with a corresponding channel.

2. A fiber-optic access system according to claim 1, said system providing communication between said optical network units and homes, said fiber-optic access system further comprises a plurality of subscriber-line optical interfaces provided in said optical network units and each of which includes an array optical transmission module and an array optical reception module having configurations that are the same as those of said array optical transmission module and said optical reception module in said central office.

3. The fiber-optic access system according to claim 1, in which said array optical reception module comprises a core fiber ribbon, an array optical sensor, an array pre-amplifier IC, and a signal clock extraction IC, said ribbon, sensor, and IC's being coupled in series.

4. The fiber-optic access system according to claim 1, in which said array optical transmission module comprises a core fiber ribbon, an array semiconductor laser, and an array laser driver IC, said ribbon, laser, and driver IC being coupled in series.

5. A fiber-optic access system for subscriber optical communication adopting star type topology in an optical fiber network, said fiber-optic access system comprising:

a central office;

a plurality of optical network units located in homes and connected with said central office by optical fibers;

a plurality of optical interfaces provided in said central office, each of said plurality of optical interfaces, including an array optical transmission module having a plurality of channels through which data signals are transmitted to a sub-set of optical network units through a first corresponding sub-set of said optical fibers and an array optical reception module having a plurality of channels through which data signals are received from said sub-set of optical network units through a second corresponding sub-set of optical fibers; and a circuit provided for each channel of said array optical reception module and which extracts a clock signal for each data signal received in said each channel to synchronize said each data signal with a corresponding channel.

* * * * *